United States Patent [19]

Urasaki

[11] 4,320,983
[45] Mar. 23, 1982

[54] BALL JOINT
[75] Inventor: Yoshio Urasaki, Koganei, Japan
[73] Assignee: Nissan Motor Co., Ltd., Yokohama, Japan
[21] Appl. No.: 171,220
[22] Filed: Jul. 22, 1980
[30] Foreign Application Priority Data
  Jul. 31, 1979 [JP] Japan .................................. 54-96721
[51] Int. Cl.³ ............................................ F16C 11/06
[52] U.S. Cl. .................................................... 403/139
[58] Field of Search ................. 403/140, 139, 135, 38, 403/39, 133

[56] References Cited
U.S. PATENT DOCUMENTS
3,041,094 6/1962 Herbenar .............................. 403/39
3,074,736 1/1963 Krizman .......................... 403/135 X Primary Examiner—Andrew V. Kundrat
Attorney, Agent, or Firm—James C. Wray

[57] ABSTRACT

A ball joint includes a stud ball relatively slidably press-fitted in a ball seat consisting of a material which absorbs moisture or water and thereby expands volumetrically. The ball seat is mounted in a socket and held in position by an end cover. At least one through bore is formed in the socket and/or the end cover in order to maintain the ball seat in contact with ambient air so that the ball seat gradually expands to provide an increased frictional force between the stud ball and the ball seat. The expansion of the ball seat compensates for the gradual decrease in the frictional force with time due to the wear of the relatively sliding elements and permanent deformation of the ball seat.

8 Claims, 6 Drawing Figures

BALL JOINT

BACKGROUND OF THE INVENTION

The present invention relates to a ball joint which prevents decrease in the frictional force between a stud ball and a ball seat.

Conventional ball joint is shown in FIG. 1, which comprises a ball stud 1 with a stud ball 2. The stud ball 2 is press-fitted into a spherical recess 4 of a ball seat 3 formed of synthetic resin, e.g. nylon. The ball seat 3 is then tightly fitted into a ball socket 5 and held in the ball socket 5 by an end cover 6 which is secured to an end opening of the ball socket 5 by calking. That end opening of the ball socket 5 through which the ball stud 1 extends is covered by a dust cover 7 which forms an inner space 8 filled with lubricating grease, and which hermetically seals the interior of the ball socket 5.

A ball joint achieves the desired function by a sliding movement of the stud ball 2 relative to the ball seat 3. The sliding surfaces of those two members are liable to wear during the operation. Further, the ball seat 3 tends to deform permanently due to the load applied by the ball stud 1. Thus, the frictional force generated between the stud ball 2 and the ball seat 3 decreases with time gradually as shown in FIG. 6 at a. When the frictional force decreases beyond a certain limit from the desired value b, the ball joint for a vehicle, for example, generates a disadvantageous effect known as shimmy.

Consequently, the conventional ball joint mentioned above cannot be used for a long period, and has to be replaced by a new joint in a relatively short period requiring frequent maintenance operations.

SUMMARY OF THE INVENTION

Therefore, it is an object of the present invention to provide an improved ball joint which provides a substantially constant frictional force for a long period, and is substantially maintenance free.

The present invention achieves the above object, and is based on the following recognition. A ball seat is made of nylon, which absorbs moisture and volumetrically expands corresponding to the volume of the absorbed moisture. Thus, by keeping the surface of the ball seat in contact with ambient air at least partially, instead of hermetically sealing the ball seat, the ball seat gradually absorbs moisture contained in the ambient air, and expands volumetrically. By this expansion, the decrease in the frictional force with time can be compensated for, and the frictional force is maintained substantially constant for a long period so that the ball joint is substantially maintenance free.

According to the present invention, there is provided a ball joint comprising in combination:

a ball socket having an inner space which is open on both ends thereof;

a ball seat mounted in the inner space of the ball socket and having a spherical recess therein, said ball seat consisting of a material which absorbs moisture or water and thereby expands volumetrically;

a ball stud integral with a stud ball which is pressfitted into the spherical recess of the ball seat and slidable with respect to the ball seat;

an end cover at one end of the ball socket to hold the ball seat in the ball socket; and a dust cover at the other end of the ball socket, through which the ball stud extends and which hermetically seals the inner space of the ball socket;

at least one of the ball socket and the end cover being formed with at least one through bore which maintains the ball seat in contact with ambient air.

DESCRIPTION OF THE DRAWINGS

The present invention will now be described in detail by referring to some preferred embodiments shown in the drawings, in which.

DETAILED DESCRIPTION OF THE PREFERRED EMBODIMENTS

Figure 1:
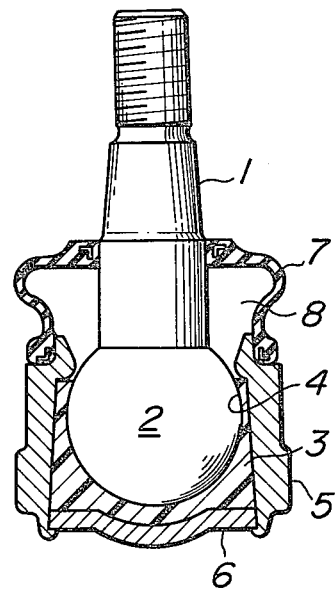
FIG. 1 is a longitudinal-sectional view of a conventional ball joint mentioned above.

Referring to FIGS. 2 to 5, reference numerals used in FIG. 1 denote the same or corresponding elements which are not further explained for the sake of simplicity.

Figure 2:
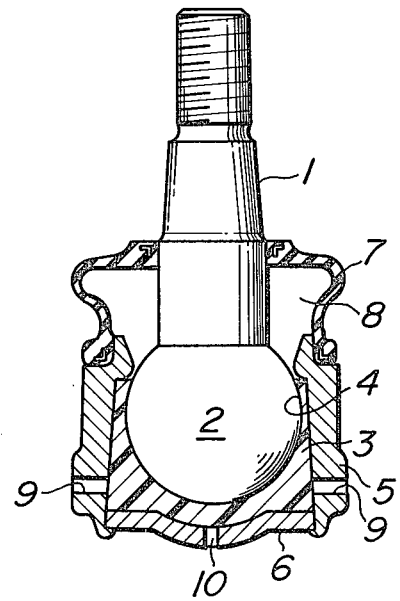
FIGS. 2 to 5 are longitudinal-sectional views of various embodiments of the ball joint according to the present invention.
Figure 3:
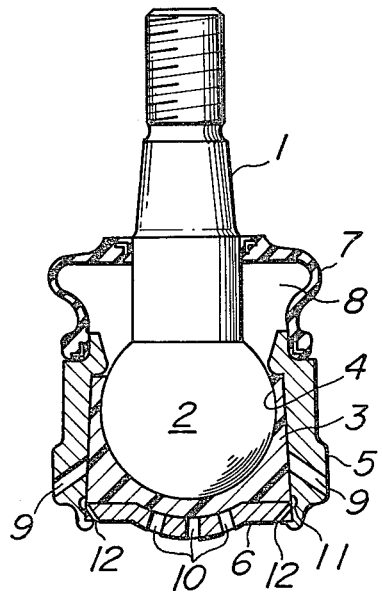
Figure 4:
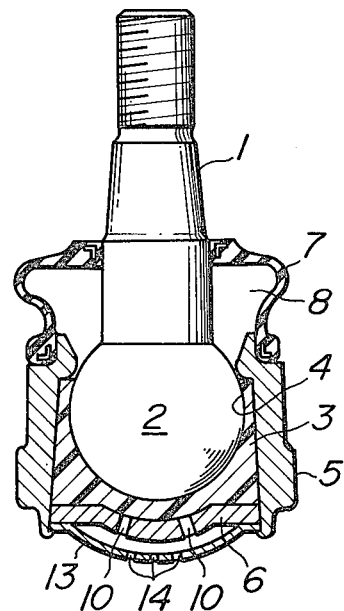
Figure 5:
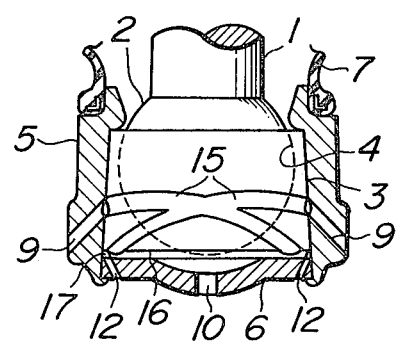

In the embodiment shown in FIG. 2, the ball socket 5 is formed on its peripheral wall with through bores 9, and the end cover 6 is formed with a central bore 10. The bores 9 and 10 maintains the surface of the ball seat 3 partially in contact with ambient air. By this, moisture contained in the ambient air or splash enters into the interior of the socket 5 through the bores 9 and 10, and is gradually absorbed by the ball seat 3. Thus the ball seat 3 gradually expands volumetrically, and the frictional force between the stud ball 2 and the ball seat 3 is gradually increased by an amount as shown by curve d in FIG. 6. The curve d having a desired characteristic may be easily obtained by suitably selecting the number, size and arrangement of the bores 9 and 10. Accordingly, with the above-mentioned arrangement, the decreased frictional force a due to the wear or deformation of the mutually sliding elements can be compensated by the increased frictional force d generated by the expanded ball seat 3 so that the initial frictional force b can be maintained unchanged for a long period, as shown in FIG. 6 at c.

Formation of the bores 9 or 10 may result in that water entered into the ball socket 5 but not absorbed by the ball seat 3 remains in the interior of the ball socket and causes the ball socket 5 or the end cover 6 to rust. The embodiment shown in FIG. 3 eliminates such a disadvantage by the following measures. The bores 9 are inclined downwardly and outwardly so that the surplus water is discharged out of the ball socket 5. The ball socket 5 is formed on its inner surface with a circumferential groove 11 which surrounds the outer periphery of the lower surface of the ball seat 3. The end cover 6 is formed with drain passages 12 which are in communication with the groove 11. Thus, the water in the ball socket 5 can be discharged through the groove 11 and the drain passages 12. A similar effect can be attained by increasing the number of the bores 10 within a range in which the desired characteristic curve d is not affected, and by using the bores 10 as the drain passages as well. Since the surplus water is discharged from the bores 9, 10 and/or the drain passages 12, the ball socket 5 and the end cover 6 are prevented from rust.

Figure 6:
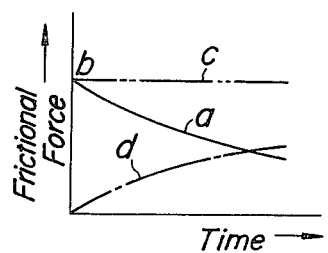
FIG. 6 is a graph showing the variation characteristic with time in the frictional force between the stud ball and the ball seat of the ball joint.

With the above-mentioned arrangement, when the splash comes in direct contact with the ball seat 3, the required characteristic curve d shown in FIG. 6 may not be obtained. Thus, in the embodiment shown in FIG. 4, the ball socket is not formed with the bores 9, and only the end cover 6 has the bores 10. A second end cover 13 is further provided, which is located below the first end cover 6 and secured to the ball socket 5 by calking. The second end cover 13 is formed with through bores 14 which are arranged such that they do not align with the bores 10 of the first end cover 6. By this arrangement, the ball seat 3 is kept in contact with the ambient air and gradually expands by absorbing the moisture. However, the splash having passed through the bores 14 impinges upon the end surface of the cover 6 and is prevented from entering into the through bore 10. Consequently, the splash is prevented from directly contacting with the ball seat 3, and is discharged through the bores 14. Thus the required characteristic curve d shown in FIG. 6 can be positively attained without being affected by the splash.

Formation of the bores 9 and 10 only may not be effective in supplying sufficient amount of moisture or water to be absorbed by the ball seat 3. Thus in the embodiment shown in FIG. 5, grooves 15 which are in communication with the through bores 9 are formed on the inner periphery of the ball socket 5 or on the outer surface of the ball seat 3. The grooves 15 extend as far as a lower chamfered portion 16 of the ball seat 3. The chamfered portion 16 defines a space 17 which is communicated with the exterior of the ball socket 5 through the bore 10 and the drain passages 12. With this arrangement, the ambient air or water enters through the bores 9 into the ball socket 5, and is discharged through the grooves 15, the space 17 as well as the bore 10 and the passages 12. As the ambient air or water contacts with the ball seat 3 over a substantial area during the passage through the grooves 15, the ball seat 3 is supplied with sufficient amount of moisture or water so that the ball seat 3 is sufficiently expanded to provide the required increase in the frictional force.

As is apparent from the foregoing description, the present invention provides an improved ball joint of which the ball seat 3 is partly in contact with ambient air or water. The ball seat 3 absorbs the moisture or water gradually and expands volumetrically to provide an enhanced interference fit between the stud ball 2 and the ball seat 3 and an increased frictional force as shown by the curve d in FIG. 6. This increased frictional force compensates for the decreased frictional force a so that a desired frictional force b can be kept substantially constant for a long period, as shown in FIG. 6 at c. Thus the ball joint according to the present invention has a superior durability and is substantially maintenance free.

Although the present invention has been explained with reference to the illustrated embodiments, various modifications and changes in the details may be made without departing from the scope of the present invention.

What is claimed is:
1. A ball joint comprising:
a ball socket having an inner space which is open on both ends thereof;
a ball seat mounted in the inner space of the ball socket and having a spherical recess therein, said ball seat consisting of a material which absorbs moisture or water and thereby expands volumetrically;
a ball stud integral with a stud ball which is pressfitted into the spherical recess of the ball seat and slidable with respect to the ball seat;
an end cover at one end of the ball socket to hold the ball seat in the ball socket; and
a dust cover at the other end of the ball socket, through which the ball stud extends and which hermetically seals the inner space of the ball socket;
at least one of the ball socket and the end cover being formed with at least one through bore which maintains an outer surface of the ball seat in contact with ambient air.

2. A ball joint as claimed in claim 1, wherein that portion of the inner periphery of the ball socket which is adjacent to the end cover is formed with an annular groove which is in communication with at least one drain passage formed through the end cover.

3. A ball joint comprising
a ball socket having an inner space which is open on both ends thereof;
a ball seat mounted in the inner space of the ball socket and having a spherical recess therein, said ball seat consisting of a material which absorbs moisture or water and thereby expands volumetrically;
a ball stud integral with a stud ball which is pressfitted into the spherical recess of the ball seat and slidable with respect to the ball seat;
an end cover at one end of the ball socket to hold the ball seat in the ball socket; and
a dust cover at the other end of the ball socket, through which the ball stud extends and which hermetically seals the inner space of the ball socket;
said end cover having at least one through bore which maintains the ball seat in contact with ambient air, and forming a first end cover, a second end cover being secured to the ball socket and formed with at least one through bore which is not aligned with said at least one bore of the first end cover.

4. A ball joint comprising
a ball socket having an inner space which is open on both ends thereof;
a ball seat mounted in the inner space of the ball socket and having a spherical recess therein, said ball seat consisting of a material which absorbs moisture or water and thereby expands volumetrically;
a ball stud integral with a stud ball which is pressfitted into the spherical recess of the ball seat and slidable with respect to the ball seat;
an end cover at one end of the ball socket to hold the ball seat in the ball socket; and
a dust cover at the other end of the ball socket, through which the ball stud extends and which hermetically seals the inner space of the ball socket;
at least one of the ball socket and the end cover being formed with at least one through bore which maintains the ball seat in contact with ambient air;
that end surface of the ball seat which opposes to the end cover having a chamfered periphery defining between the ball seat and the end cover an annular space which is in communication with at least one drain passage formed through the end cover.

5. A ball joint as claimed in claim 4 wherein the ball socket has said at least one bore, the ball seat on the outer surface being formed with at least one groove which is in communication with said at least one bore of the ball socket and with said at least one drain passage of the end cover.

6. A ball joint comprising a ball socket having an inner space which is open on both ends thereof;

a ball seat mounted in the inner space of the ball socket and having a spherical recess therein, said ball seat consisting of a material which absorbs moisture or water and thereby expands volumetrically;

a ball stud integral with a stud ball which is pressfitted into the spherical recess of the ball seat and slidable with respect to the ball seat;

an end cover at one end of the ball socket to hold the ball seat in the ball socket; and a dust cover at the other end of the ball socket, through which the ball stud extends and which hermetically seals the inner space of the ball socket;

that portion of the inner periphery of the ball socket which is adjacent to the end cover being formed with an annular groove which is in communication with at least one drain passage formed through the end cover;

the ball socket having at least one through bore which maintains the ball seat in contact with ambient air, the ball seat on the outer surface being formed with at least one groove which is in communication with said at least one bore of the ball socket and with said at least one drain passage of the end cover.

7. A ball joint as claimed in claims 1, 4 or 6 wherein said ball socket is formed with said at least one bore which is inclined downwardly and outwardly.

8. A ball joint as claimed in claim 2 or 4, wherein the ball socket has said at least one bore, the ball socket on the inner surface being formed with at least one groove which is in communication with said at least one bore of the ball socket and with said at least one drain passage of the end cover.

* * * * *